United States Patent
Pal et al.

(10) Patent No.: US 10,988,682 B2
(45) Date of Patent: Apr. 27, 2021

(54) USING POLYAMINATED FATTY ACID-BASED OIL COMPOSITIONS FOR CONTROLLING DUST FROM ADDITIVE PARTICLES

(71) Applicant: Halliburton Energy Services, Inc., Houston, TX (US)

(72) Inventors: Omprakash Ramkhilavan Pal, Al Khobar (SA); Jason Eric Maxey, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/709,575

(22) Filed: Dec. 10, 2019

(65) Prior Publication Data
US 2020/0115625 A1    Apr. 16, 2020

Related U.S. Application Data

(62) Division of application No. 15/761,762, filed as application No. PCT/US2015/059399 on Nov. 6, 2015, now Pat. No. 10,533,126.

(51) Int. Cl.
C09K 8/80 (2006.01)
C09K 3/22 (2006.01)
(Continued)

(52) U.S. Cl.
CPC ............... *C09K 8/805* (2013.01); *C09K 3/22* (2013.01); *C09K 8/03* (2013.01); *C09K 8/62* (2013.01);
(Continued)

(58) Field of Classification Search
None
See application file for complete search history.

(56) References Cited

U.S. PATENT DOCUMENTS 5,968,222 A    10/1999  Kodali
6,355,083 B1    3/2002  Ogzewalla
(Continued)

FOREIGN PATENT DOCUMENTS

WO    2008139139    11/2008
WO    2013108057    7/2013

OTHER PUBLICATIONS

International Search Report and Written Opinion for PCT/US2015/059399 dated Sep. 7, 2016.
(Continued)

*Primary Examiner* — Jeffrey D Washville
(74) *Attorney, Agent, or Firm* — Thomas Rooney; C. Tumey Law Group PLLC

(57) ABSTRACT

Application of polyaminated fatty acid-based oil compositions to additive particles to control dusting. A method reducing an amount of dust produced during transfer of additive particles in well operations may comprise providing treated additive particles comprising additive particles and a polyaminated fatty acid-based oil composition disposed on a surface of at least portion of the particles, wherein the polyaminated fatty acid-based oil composition comprises a polyaminated fatty acid and an organic solvent. The method may further comprise mixing components comprising the treated additive particles and a base fluid to provide a treatment fluid. The method may further comprise introducing the treatment fluid into a subterranean formation.

13 Claims, 2 Drawing Sheets

(51) Int. Cl.
*C09K 8/03* (2006.01)
*C09K 8/62* (2006.01)
*C09K 8/64* (2006.01)
*C09K 8/66* (2006.01)
*C09K 8/82* (2006.01)
*C09K 8/84* (2006.01)
*C09K 8/92* (2006.01)
*E21B 43/267* (2006.01)
*E21B 43/04* (2006.01)
*E21B 33/14* (2006.01)

(52) U.S. Cl.
CPC .................. *C09K 8/64* (2013.01); *C09K 8/66* (2013.01); *C09K 8/82* (2013.01); *C09K 8/84* (2013.01); *C09K 8/92* (2013.01); *E21B 43/267* (2013.01); *C09K 2208/04* (2013.01); *C09K 2208/10* (2013.01); *E21B 33/14* (2013.01); *E21B 43/04* (2013.01)

(56) References Cited

U.S. PATENT DOCUMENTS

| | | |
|---|---|---|
| 6,443,661 B1 | 9/2002 | Warthen |
| 6,589,442 B1 | 7/2003 | Wilson et al. |
| 2006/0172895 A1 | 8/2006 | Mang et al. |
| 2007/0004811 A1 | 1/2007 | Brunner et al. |
| 2008/0049544 A1 | 2/2008 | Bingham et al. |
| 2009/0192052 A1 | 7/2009 | Zhang |
| 2010/0319921 A1 | 12/2010 | Eia et al. |
| 2014/0284056 A1* | 9/2014 | Kulkarni .................. C09K 8/82 166/305.1 |
| 2014/0349896 A1* | 11/2014 | Hagenaars ............... C09K 8/80 507/125 |
| 2015/0204166 A1 | 7/2015 | Sanborn et al. |

OTHER PUBLICATIONS

Office Action Summary for U.S. Appl. No. 15/761,762 dated Apr. 1, 2019.

* cited by examiner

USING POLYAMINATED FATTY ACID-BASED OIL COMPOSITIONS FOR CONTROLLING DUST FROM ADDITIVE PARTICLES

BACKGROUND

The present disclosure relates to controlling dusting from additive particles in well operations and, more particularly, to application of polyaminated fatty acid-based oil compositions to additive particles to control dusting.

In the oil and gas industry, additive particles are commonly used that may be prone to "dusting." "Dusting" may occur when the additive particles are transferred or moved and smaller particulates or dust get stirred up and remain in the air instead of moving into the new container or location. Dusting may be quite problematic. Proppant is one type of additive particle that may commonly be used to prop fractures in an open position. A common proppant is sand. Sand may be prone to dusting as the smaller silica particulates or dust tends to get stirred up into the air during transfer. The proppant may often be stored in a storage container, such as a silo, so the proppant is on-hand and readily available at the work site when needed for subterranean treatments. Dusting may generally occur, for example, when transferring the proppant into the storage container or removing the proppant from the storage container for use in the subterranean treatments.

In order to combat the problems of dusting, a liquid, such as water may be sprayed onto the additive particles before and/or during transfer of the particles. The liquid may help weight down the smaller particulates of dust and keep them from becoming stirred up or airborne. Moreover, equipment, such as a vacuum, may be used to suck the dust out of the air. However, some of the disadvantages to using a liquid to combat dusting is that the liquid may evaporate, which may leave the additive particles susceptible to dusting during the next transfer. As a result, when a liquid is used, it is common to have to keep re-applying the liquid before or during each transfer of the particles. Additionally, equipment, such as a vacuum, may be expensive and cumbersome due to the physical size and handling of the equipment near the transfer area.

BRIEF DESCRIPTION OF THE DRAWINGS

The features and advantages of certain embodiments will be more readily appreciated when considered in conjunction with the accompanying figures. The figures are not to be construed as limiting any of the preferred embodiments.

DETAILED DESCRIPTION

Figure 1:
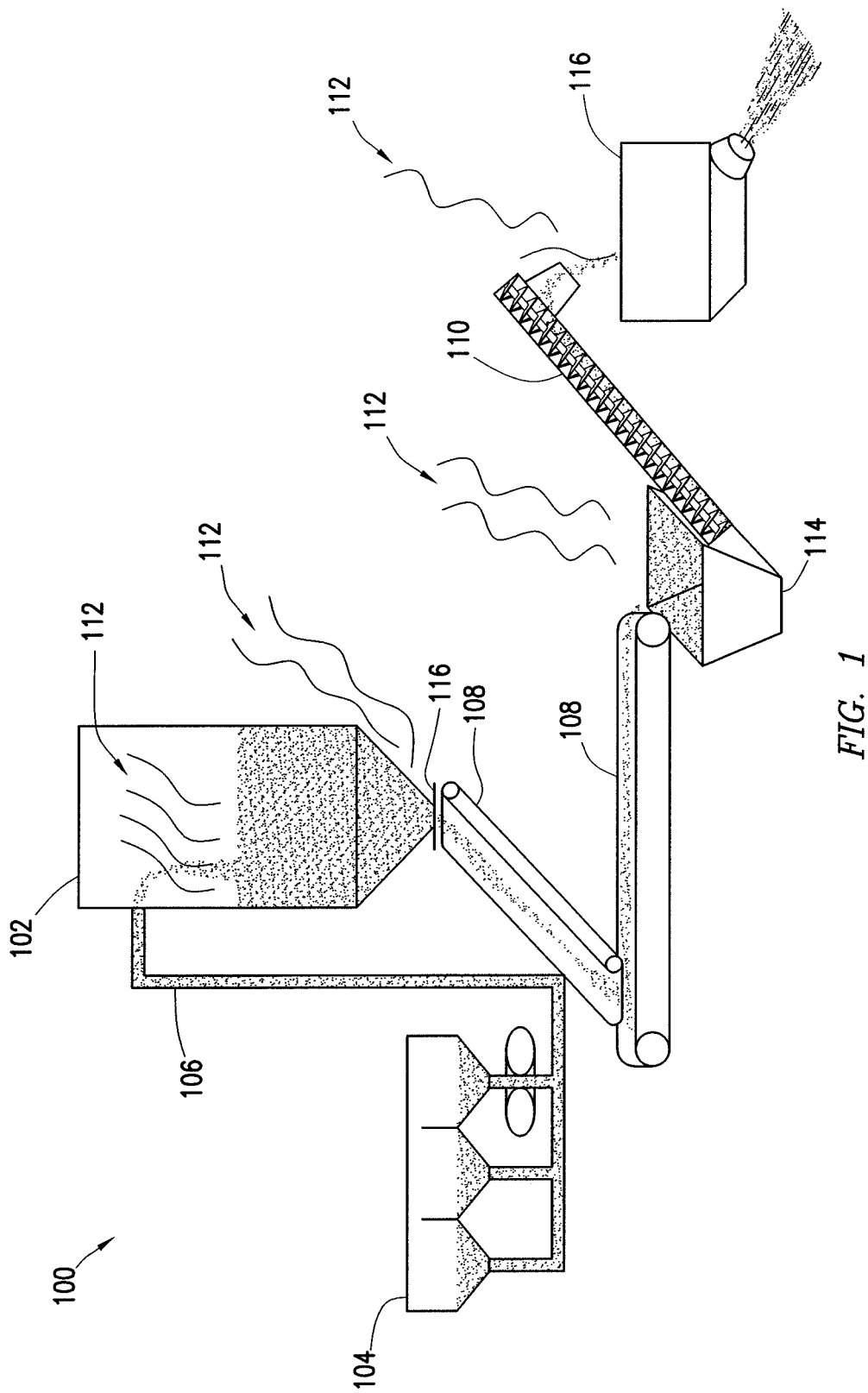
FIG. 1 is a schematic diagram of a system for transferring additive particles from a storage container to one or more mixing vessels.

The present disclosure relates to controlling dusting from additive particles in well operations. It has been discovered that compositions comprising a polyaminated fatty acid and an organic solvent may be used to treat additive particles. These compositions may be referred to herein as "polyaminated fatty acid-based oil compositions." The polyaminated fatty acid-based oil composition may modify the surface of at least some of the additive particles in which particulates of dust may become stuck to or at least attracted to the particles such that the dust is less likely to become stirred up during transfer. Advantageously, additive particles treated with the polyaminated fatty acid-based oil composition may only need to be treated one time because the polyaminated fatty acid-based oil composition should not evaporate like other liquids and/or oils should be stable at temperatures up to 350° F. (177° C.) for several days to months without evaporating, degrading, or oxidizing, and cumbersome equipment may not be needed to combat the production of dust during transfers.

It is to be understood that the discussion of embodiments regarding additive particles, the storage container, or polyaminated fatty acid-based oil composition are intended to apply to the method and system embodiments.

Polyaminated fatty acids are fatty acids that comprise at least two reactive amine groups. The reactive amine groups may be primary amino groups, secondary amine groups, or combinations thereof. Fatty acids are carboxylic acids with an aliphatic tail, which may be saturated or unsaturated. Suitable fatty acids may include those characterized as short-chain fatty acids (aliphatic tail of less than 6 carbon atoms), medium-chain fatty acids (aliphatic tail of 6 to 12 carbon atoms), or long-chain fatty acids (aliphatic tail longer than 13 carbon atoms). Without limitation, suitable saturated fatty acids may include caprylic acid, capric acid, lauric acid, myristic acid, palmititc acid, stearic acid, arachidic acid, behenic acid, lignoceric acid, and cerotic acid. Without limitation, suitable unsaturated fatty acids may include myristoleic acid, palmitoleic acid, sapienic acid, oleic acid, elaidic acid, vaccenic acid, linoleic acid, linoelaidic acid, arachidonic acid, eicosaentaenoicacid, and euric acid. Combinations of two or more different fatty acids may also be used.

The polyaminated fatty acid may be combined with an organic solvent. Without limitation, the polyaminated fatty acid may be combined with the organic solvent due to the viscous and tacky nature of the polyaminated fatty acid, which may make it difficult to apply to the additive particle. Without limitation, the polyaminated fatty acid in which the polyaminated fatty acid may be dispersed or otherwise combined may include any of variety of organic solvents, including, but not limited to, vegetable oils, nut oils, citrus oils, synthetic oils, mineral oil, aromatic solvents, terpene, kerosene, diesel, derivatives of any of the foregoing, and any combination of any of the foregoing in any proportion. Examples of suitable vegetable oils may include canola oil, coconut oil, corn oil, cottonseed oil, flaxseed oil, olive oil, palm oil, peanut oil, safflower oil, rice bran oil, soybean oil, sunflower oil, or combinations thereof. Examples of suitable nut oils may include almond oil, beech nut oil, cashew oil, hazelnut oil, macadamia oil, mongongo oil, pecan oil, pine nut oil, pistachio oil, walnut oil, or combinations thereof. Examples of suitable citrus oils may include grapefruit seed oil, lemon oil, orange oil, or combinations thereof. Examples of suitable synthetic oils may include polyalphaolefins (poly-1-hexene, poly-1-octene, etc), diesters (diisotridecyl adipate, etc), and polyalkylene glycols (mostly copolymers of ethylene and propylene oxide).

Without limitation, the polyaminated fatty acid-based oil composition may have a ratio of about 10% to about 70% by volume of the polyaminated fatty acid and about 30% to about 90% by volume of the organic solvent. Even further, the polyaminated fatty acid-based oil composition may have a ratio of about 10% to about 50% by volume of the polyaminated fatty acid and about 90% to about 10% by volume of the organic solvent. The ratio of the polyaminated fatty acid and organic solvent will depend on a number of factors, including without limitation, viscosity, temperature, concentration of the composition on the additive particles, and the like.

The additive particles may be any additive particles in a dry form that may be prone to dusting. Examples additive particles that may be used in well operations, for example, may include sand; bauxite; ceramic materials; glass materials; polymer materials; polytetrafluoroethylene (TEFLON®) materials; resin precoated sands; resin precoated proppants; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and combinations thereof. Sand may be especially prone to dusting. Additive particles may be included as "proppant" in fracturing treatments and "gravel" in gravel packing treatments. It should be understood that the term "particulate," as used in this disclosure, includes all known shapes of materials including substantially spherical materials, fibrous materials, polygonal materials (such as cubic materials) and mixtures thereof. Moreover, fibrous materials that may or may not be used to bear the pressure of a closed fracture, are often included in proppant and gravel treatments. It should be understood that the term "proppant," as used in this disclosure, includes all known shapes of materials including substantially spherical materials, fibrous materials, polygonal materials (such as cubic materials) and mixtures thereof.

The additive particles may be bulk particles, mesoscopic particles, nanoparticles, or combinations thereof. As used herein, a "bulk particle" is a particle having a particle size greater than 1 micron. As used herein, a "mesoscopic particle" is a particle having a particle size in the range of 1 micron to 0.1 micron. As used herein, a "nanoparticle" is a particle having a particle size of less than 0.1 micron. As used herein, the term "particle size" refers to the volume surface mean diameter ("Ds"), which is related to the specific surface area of the particle. The volume surface mean diameter may be defined by the following equation: $D_s=6/(\Phi_s A_w \rho_p)$, where $\Phi_s$=sphericity; $A_w$=specific surface area; and $\rho_p$=particle density. Typically, the additive particles may have a size in the range of from about 2 mesh to about 400 mesh, U.S. Sieve Series. Without limitation, the additive particles may have particles size distribution ranges are one or more of 6/12 mesh, 8/16, 12/20, 16/30, 20/40, 30/50, 40/60, 40/70, 50/70, 70/170, or 70/200. By way of example, the additive particles may have a particle size of 2, 20. 30, 40, 50, 60, 70, 80. 90, 100, 200, 300, or 400 mesh.

Turning to FIG. 1, a system 100 for transferring additive particles from a storage container 102 to one or more mixing vessels (e.g., dry ingredient mixing bin 114 or wet ingredient mixing tube 116) is illustrated. The system 100 may include storage container 102. The storage container 102 may be, for example, a silo or similar container that may be capable of storing a large amount of additive particles. The system 100 may further include a transport trailer 104. The transport trailer 104 may transport the additive particles to the storage container 102, for example, from a warehouse or manufacturing plant. The storage container 102 may be located at the work site (e.g., well site) where the additive particles are to be used. The storage container 102 containing the additive particles may also be transported to the work site. The additive particles may be transferred from the transport trailer 104 into the storage container 102 via a transfer device, such as a transfer tube 106 or conveyor system, which may be open or closed, for example. The additive particles may be prone to dusting during the transfer and create dust 112 outside or inside of the storage container 102.

The system 100 may also include one or more additional transfer devices, such as an open conveyor 108 (e.g., a conveyor belt) or a closed conveyor 110 (e.g., an auger screw device) to transfer the additive particles to one or more mixing apparatuses, such as dry ingredient mixing bin 114 or wet ingredient dry ingredient mixing tube 116. By way of example, the additive particles may be gravity fed from the storage container 102 onto an open conveyor 108 by opening a gate valve 116 located at the bottom of the storage container 102. The additive particles may then be transferred via the open conveyor 108 into a dry ingredient mixing bin 114 where other dry ingredients may be mixed with the additive particles. The dry mixture may then be additionally transferred via a closed conveyor 110, for example, into a dry and wet ingredient mixing tub 116 or other similar device wherein the dry ingredients may be mixed with one or more fluids to form a treatment fluid.

As illustrated in FIG. 1, at each transfer point before and after being placed into storage container 102 an amount of dust 112 may be produced. There may also be dust 112 produced at every transfer point. It is to be understood that FIG. 1 is merely illustrative of a system 100 in which dusting of additive problems may be problematic and that the present discussion is intended to encompass other configurations that may be used or the transfer of additive particles.

Reducing dust produced by the additive particles may be accomplished by treating the additive particles with the polyaminated fatty acid-based oil composition. Treating the additive particles may include coating, for example, spray coating of the polyaminated fatty acid-based oil composition onto the additive particles. Other suitable methods may be used for treating the additive particles with the polyaminated fatty acid-based oil composition, including mixing the polyaminated fatty acid-based oil composition with the additive particles. The additive particles treated with the polyaminated fatty acid-based oil composition may include the polyaminated fatty acid-based oil composition disposed on a surface of at least a portion of the additive particles, for example, disposed on a surface of at least 80%, 90%, 95%, 99%, or more of the additive particles. Polyaminated fatty acid-based oil compositions may be particularly useful for applying to additive particles due to their environmentally nature and/or ability to allow for the additive particles to remain dry during their application. Remaining dry may prevent the additive particles from sticking to one another during application, thus allowing the additive particles to remain free flowing even after application of the polyaminated fatty acid-based oil composition. Application of the polyaminated fatty acid-based oil composition to the additive particles may reduce the amount of dust produced within system 100 and/or during transportation of the additive particles.

The polyaminated fatty acid-based oil composition may be used in a concentration sufficient to provide the desired dusting control within system 100 and/or transportation of the additive particles while also maintaining the flowability of the treated additive particles. Without limitation, the polyaminated fatty acid-based oil composition may be applied to the additive particles in a concentration in the range of about 0.01% to about 5% v/w, or about 0.05% to about 1% v/w, or about 0.05% to about 0.5% v/w, or about 0.1% to about 0.25% v/w, wherein "v/w" refers to volume of the polyaminated fatty acid-based oil composition by weight of the additive particles.

The additive particles may be flowable prior to and after being treated with the biodegradable oil. As used herein, the term "flowable" means that the additive particles may flow, be poured, free flow under the force of gravity, be pumped, and conform to the outline of a container. In this manner, the additive particles may be pumped, for example, from transport trailer 102 and into storage container 102. The additive particles may also flow from storage container 102, for example by gravity feed, onto an open or closed conveyor, such as open conveyor 108.

The additive particles may be treated with the polyaminated fatty acid-based oil composition at a variety of times. By way of example, the additive particles may be treated at any time prior to a transfer in which dust is likely to be produced. The additive particles may be treated prior to, during, or after transfer into storage container 102. By way of example, the additive particles may be treated at a manufacturing facility or when placed into transport trailer 104. The additive particles may also be treated as the additive particles are being transferred into storage container 102. By way of another example, the additive particles may be treated when leaving storage container 102, for example during gravity feeding onto open conveyor 108. The additive particles may also be treated before or after being transferred into a mixing apparatus, such as the dry ingredient mixing bin 114 or the dry and wet ingredient mixing tub 116, from the storage container 102. It may be advantageous to treat the additive particles as far up the chain as possible, for example prior to being transferred into storage container 102 or upon exiting the storage container 102. In this manner, the amount of dust 112 that is produced may be decreased as often as possible at each transfer point. This also eliminates the need to use other liquids, such as water, or equipment to try and reduce the amount of dust produced prior to treatment with the biodegradable oil. As such, the additive particles may be treated once and the amount of dust produced during each subsequent transfer may be reduced and possibly eliminated.

The methods may further include using the treated additive particles in an operation at the work site. The operation may be a subterranean treatment in an oil and gas well. For example, the treated additive particles may be used in or in conjunction with numerous well operations, including but not limited to cementing, fracturing, gravel packing, "frac-packing," screened completions, screenless completions, drilling, acidizing (e.g. matrix acidizing or fracture acidizing), conformance treatments (e.g., water control, relative permeability modifiers, etc.), other sand control applications (e.g. formation consolidation, near wellbore consolidation, etc.), fluid loss "pills", scale treatments, hydrate control treatments, and the like.

Well operations may include introducing a treatment fluid comprising a treated additive particle into a subterranean formation. The treated additive particle may comprise an additive particle that has been treated with a polyaminated fatty acid-based oil composition as described above, in that at least a portion of the additive particles may include the polyaminated fatty acid-based oil composition disposed on a surface thereof. Introduction in the subterranean formation includes introducing into the portion of the subterranean surrounding a wellbore in the subterranean formation, as well as introduction of the treatment fluid into a wellbore penetrating the subterranean formation. The additive particle may be deposited in the subterranean formation, among other purposes, to form a portion of a gravel pack and/or to hold open conductive channels or fractures within the subterranean formation (e.g., forming a "proppant pack" within a subterranean fracture). The treatment fluid may be introduced into the subterranean formation a fracturing pressure to create or enhance one or more fractures within the subterranean formation. "Enhancing" one or more fractures in a subterranean formation may include the extension or enlargement of one or more natural or previously created fractures in the subterranean formation.

Subterranean treatments may include a cementing operation that comprises introducing a cement composition comprising a treated additive particle into a subterranean formation and allowing the cement composition to set. The treated additive particle may comprise an additive particle that has been treated with a polyaminated fatty acid-based oil composition as described above. The cement composition may set to form a hardened mass. The cement composition may set in an annular space between the walls of the wellbore and the exterior surface of the pipe string (e.g., casing, liners, expandable tubulars, etc.) disposed therein to thereby form an annular sheath of hardened, substantially impermeable cement (i.e., a cement sheath) that may support and position the pipe string in the wellbore, as well as bonding the exterior surface of the pipe string to the subterranean formation (or larger conduit). This process for cementing a pipe string in place may commonly be referred to as "primary cementing." Cement compositions also may be used in remedial cementing methods, for example, to seal cracks or holes in pipe strings or cement sheaths, to seal highly permeable formation zones or fractures, to place a cement plug, and the like.

Figure 2:
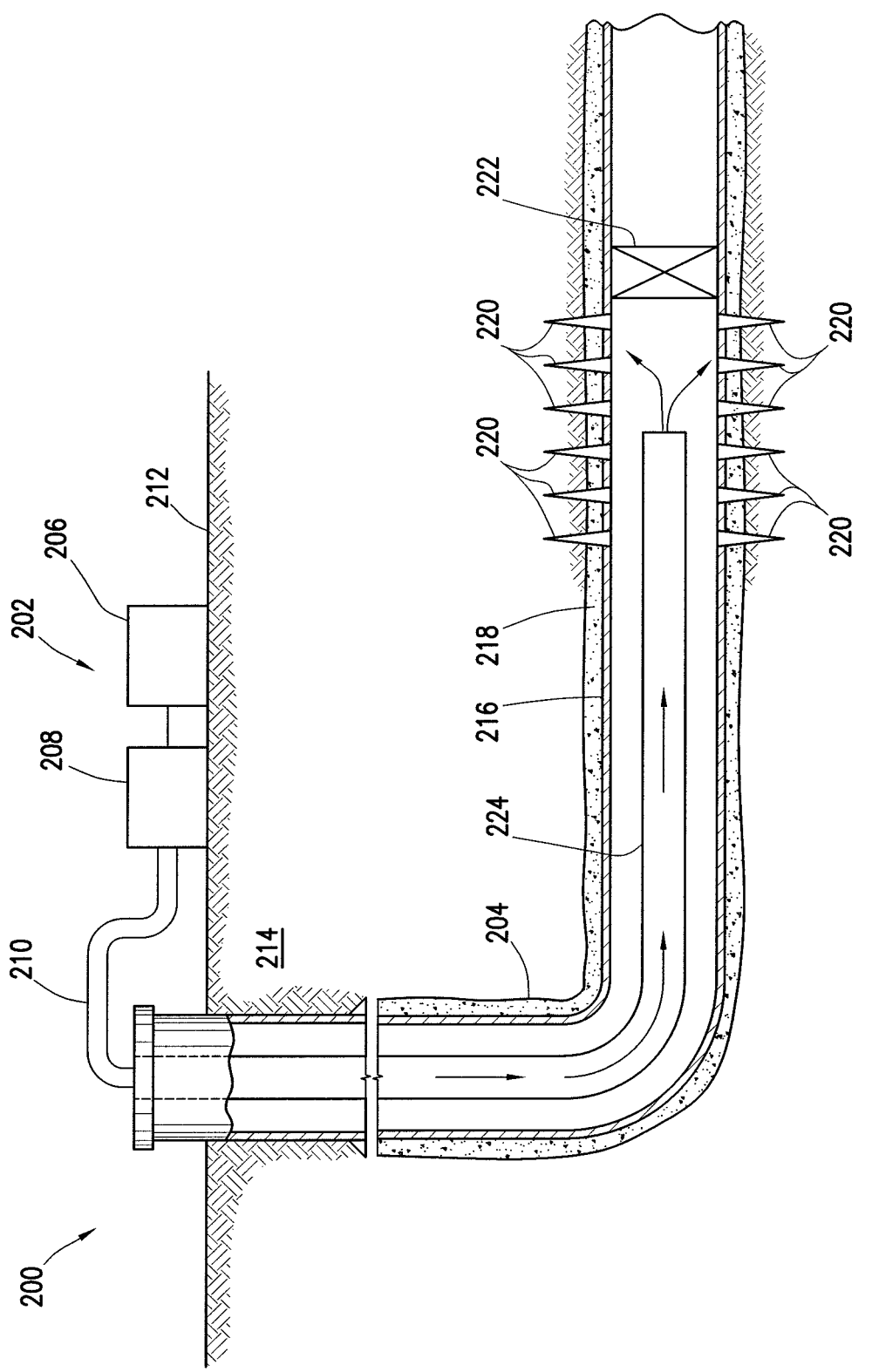
FIG. 2 is a schematic illustration of a well system that may be used for placement of a treatment fluid into a wellbore.

Example methods of using the additive particles will now be described in more detail with reference to FIG. 2. Any of the previous examples of the treated additive particles may apply in the context of FIG. 2. FIG. 2 illustrates an example well system 200 that may be used for preparation and delivery of a treatment fluid downhole. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. Referring now to FIG. 2, a fluid handling system 202 is illustrated. The fluid handling system 202 may be used for preparation of a treatment fluid comprising treated additive particles and for introduction of the treatment fluid into a wellbore 204. The fluid handling system 202 may include mobile vehicles, immobile installations, skids, hoses, tubes, fluid tanks or reservoirs, pumps, valves, and/or other suitable structures and equipment. As illustrated, the fluid handling system 202 may comprise a fluid supply vessel 206, pumping equipment 208, and wellbore supply conduit 210. While not illustrated, the fluid supply vessel 206 may contain one or more components of the treatment fluid (e.g., treated additive particles, base fluid, etc.) in separate tanks or other containers that may be mixed at any desired time. Pumping equipment 208 may be fluidically coupled with the fluid supply vessel 206 and wellbore supply conduit 210 to communicate the treatment fluid into wellbore 204. Fluid handling system 202 may also include surface and downhole sensors (not shown) to measure pressure, rate, temperature and/or other parameters of treatment. Fluid handling system 202 may include pump controls and/or other types of controls for starting, stopping, and/or otherwise controlling pumping as well as controls for selecting and/or otherwise controlling fluids pumped during the injection treatment. An injection control system may communicate with such equipment to monitor and control the injection of the treatment fluid. As depicted in FIG. 2, the fluid supply vessel 206 and pumping equipment 208 may be above the surface 212 while the wellbore 204 is below the surface 112. As will be appreciated by those of ordinary skill in the art, well system 200 may be configured as shown in FIG. 2 or in a different manner, and may include additional or different features as appropriate. By way of example, fluid handling system 202 may be deployed via skid equipment, marine vessel, or may be comprised of sub-sea deployed equipment.

Without continued reference to FIG. 2, well system 200 may be used for introduction of a treatment fluid into wellbore 204. The treatment fluid may contain a base fluid (which may be oil- or aqueous-based) and treated additive particles, described herein. Generally, wellbore 204 may include horizontal, vertical, slanted, curved, and other types of wellbore geometries and orientations. Without limitation, the treatment fluid may be applied through the wellbore 204 to subterranean formation 214 surrounding any portion of wellbore 204. As illustrated, the wellbore 204 may include a casing 216 that may be cemented (or otherwise secured) to wellbore wall by cement sheath 218. Perforations 220 allow the treatment fluid and/or other materials to flow into and out of the subterranean formation 214 A plug 222, which may be any type of plug (e.g., bridge plug, etc.) may be disposed in wellbore 204 below the perforations 220 if desired.

The treatment fluid comprising the treated additive particles may be pumped from fluid handling system 202 down the interior of casing 216 in wellbore 204. As illustrated, well conduit 224 (e.g., coiled tubing, drill pipe, etc.) may be disposed in casing 216 through which the treatment fluid may be pumped. The well conduit 224 may be the same or different than the wellbore supply conduit 210. For example, the well conduit 224 may be an extension of the wellbore supply conduit 210 into the wellbore 204 or may be tubing or other conduit that is coupled to the wellbore supply conduit 210. The treatment fluid may be allowed to flow down the interior of well conduit 224, exit the well conduit 224, and finally enter subterranean formation 214 surrounding wellbore 204 by way of perforations 220 through the casing 216 (if the wellbore is cased as in FIG. 2) and cement sheath 218. Without limitation, the treatment fluid may be introduced into subterranean formation 214 whereby one or more fractures (not shown) may be created or enhanced in subterranean formation 214. For example, the treatment fluid may be introduced into subterranean formation 214 at or above fracturing pressure. Without limitation, at least a portion of the treated additive particles may be deposited in the subterranean formation to hold open fractures in subterranean formation 214.

Accordingly, this disclosure describes methods, compositions, and systems that may be used for reducing dust in well operations. Without limitation, a method of reducing an amount of dust produced during transfer of additive particles in well operations may comprise providing treated additive particles comprising additive particles and a polyaminated fatty acid-based oil composition disposed on a surface of at least portion of the particles. The polyaminated fatty acid-based oil composition may comprise a polyaminated fatty acid and an organic solvent. The method may further comprise mixing components comprising the treated additive particles and a base fluid to provide a treatment fluid.

This method of reducing an amount of dust produced during transfer of additive particles in well operations may include any of the various features of the compositions, methods, and systems disclosed herein. Without limitation, this method of reducing an amount of dust may include one or more of the following elements in any combination. The method may further include introducing the treatment fluid into a subterranean formation. The method may further include treating the additive particles with the polyaminated fatty acid-based oil composition. The method may further include transferring the additive particles into a storage container, wherein the additive particles are treated with the polyaminated fatty acid-based oil composition prior to, during, or after transfer into the storage container. The method may further include transferring the treated additive particles to one or more mixing apparatuses. The method may further include wherein the additive particles are bulk particles, mesoscopic particles, nanoparticles, or combinations thereof. The method may further include wherein the additive particles comprise at least one material selected from the group consisting of include sand; bauxite; ceramic material; glass material; resin precoated sands; resin pre-coated proppants; polymer material; polytetrafluoroethylene material; nut shell pieces; seed shell pieces; cured resinous particulate comprising nut shell pieces; cured resinous particulate comprising seed shell pieces; fruit pit pieces; cured resinous particulate comprising fruit pit pieces; wood; composite particulates and combinations thereof. The method may further include introducing the treatment fluid into the subterranean formation at or above a fracturing pressure, wherein the treated additive particles are deposited into a fracture in the subterranean formation to hold open the fracture. The method may further include wherein the additive particles comprise sand. The method may further include wherein the polyaminated fatty acid is a saturated fatty acid that comprises two or more reactive amine groups. The method may further include wherein the saturated fatty acid has an aliphatic tail length of at least 13 carbon atoms. The method may further include wherein polyaminated fatty acid-based oil composition is present in the treated additive particles in a concentration of about 0.01% v/w to about 5% v/w.

Without limitation, another method of reducing an amount of dust produced during transfer of additive particles in well operations may comprise providing treated additive particles comprising additive particles and a polyaminated fatty acid-based oil composition disposed on a surface of at least portion of the particles. The polyaminated fatty acid-based oil composition may comprise a polyaminated fatty acid and an organic solvent. The method may further comprise transferring the treated additive particles into a mixing apparatus. The method may further comprise mixing components comprising the treated additive particles and a base fluid to provide a treatment fluid. The method may further comprise introducing the treatment fluid into a subterranean formation at or above a fracturing pressure of the subterranean formation.

This additional method of reducing an amount of dust produced during transfer of additive particles in well operations may include any of the various features of the compositions, methods, and systems disclosed herein. Without limitation, this additional method of reducing an amount of dust may include one or more of the following elements in any combination. This additional method may further include treating the additive particles with the polyaminated fatty acid-based oil composition. The method may further include transferring the additive particles into a storage container, wherein the additive particles are treated with the polyaminated fatty acid-based oil composition prior to, during, or after transfer into the storage container. The method may further include wherein the additive particles are bulk particles, mesoscopic particles, nanoparticles, or combinations thereof. The method may further include wherein the additive particles comprise at least one material selected from the group consisting of include sand, bauxite; ceramic material; glass material; resin precoated sands; resin precoated proppants; polymer material; polytetrafluoroethylene material; nut shell pieces; seed shell pieces; cured resinous particulate comprising nut shell pieces; cured resinous particulate comprising seed shell pieces; fruit pit pieces; cured resinous particulate comprising fruit pit pieces; wood; composite particulates and combinations thereof. The method may further wherein the treated additive particles are deposited into a fracture in the subterranean formation to hold open the fracture. The method may further include wherein the additive particles comprise sand. The method may further include wherein the polyaminated fatty acid is a saturated fatty acid that comprises two or more reactive amine groups. The method may further include wherein the saturated fatty acid has an aliphatic tail length of at least 13 carbon atoms. The method may further include wherein polyaminated fatty acid-based oil composition is present in the treated additive particles in a concentration of about 0.01% v/w to about 5% v/w.

Without limitation, a composition may be provided comprising additive particles for a well treatment fluid and a polyaminated fatty acid-based oil composition disposed on a surface of at least portion of the additive particles, wherein the polyaminated fatty acid-based oil composition comprises a polyaminated fatty acid and an organic solvent. The additive particles may be bulk particles, mesoscopic particles, nanoparticles, or combinations thereof. The additive particles may comprise proppant. The additive particles may comprise at least one material selected from the group consisting of include sand; bauxite; ceramic material; glass material; resin precoated sands; resin precoated proppants; polymer material; polytetrafluoroethylene material; nut shell pieces; seed shell pieces; cured resinous particulate comprising nut shell pieces; cured resinous particulate comprising seed shell pieces; fruit pit pieces; cured resinous particulate comprising fruit pit pieces; wood; composite particulates and combinations thereof. The polyaminated fatty acid may be a saturated fatty acid that comprises two or more reactive amine groups. The saturated fatty acid may have an aliphatic tail length of at least 13 carbon atoms. The polyaminated fatty acid-based oil composition may be present on the additive particles in a concentration of about 0.01% v/w to about 5% v/w. The composition may further comprise a well treatment fluid, wherein the well treatment fluid comprises the additive particles disposed in a base fluid.

Without limitation, a well system may be provided that comprises treated additive particles comprising additive particles and a polyaminated fatty acid-based oil composition disposed on a surface of at least portion of the particles, wherein the polyaminated fatty acid-based oil composition comprises a polyaminated fatty acid and an organic solvent. The well system may further comprise a fluid handling system comprising a fluid supply vessel, pumping equipment fluidly coupled to the fluid supply vessel and a wellbore supply conduit fluidly coupled to a wellbore and the pumping equipment, wherein the wellbore supply conduit is configured to convey a treatment fluid comprising the treated additive particles into the wellbore.

This well system may include any of the various features of the compositions, methods, and systems disclosed herein. Without limitation, this well system may include one or more of the following elements in any combination. The well system may include wherein the additive particles are bulk particles, mesoscopic particles, nanoparticles, or combinations thereof. The well system may further include wherein the additive particles comprise at least one material selected from the group consisting of include sand; bauxite; ceramic material; glass material; resin precoated sands; resin precoated proppants; polymer material; polytetrafluoroethylene material; nut shell pieces; seed shell pieces; cured resinous particulate comprising nut shell pieces; cured resinous particulate comprising seed shell pieces; fruit pit pieces; cured resinous particulate comprising fruit pit pieces; wood; composite particulates and combinations thereof. The well system may further include wherein the additive particles comprise sand. The well system may further include wherein the polyaminated fatty acid is a saturated fatty acid that comprises two or more reactive amine groups. The well system may further include wherein the saturated fatty acid has an aliphatic tail length of at least 13 carbon atoms. The well system may further include wherein polyaminated fatty acid-based oil composition is present in the treated additive particles in a concentration of about 0.01% v/w to about 5% v/w.

The exemplary treated additive particles with a polyaminated fatty acid-based oil composition disclosed herein may directly or indirectly affect one or more components or pieces of equipment associated with the preparation, delivery, recapture, recycling, reuse, and/or disposal of the permeability modifiers. For example, the treated additive particles may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the permeability modifiers. The treated additive particles may also directly or indirectly affect any transport or delivery equipment used to convey the permeability modifier to a well site or downhole such as, for example, any transport vessels, conduits, pipelines, trucks, tubulars, and/or pipes used to compositionally move the permeability modifier from one location to another, any pumps, compressors, or motors (e.g., topside or downhole) used to drive the treated additive particles into motion, any valves or related joints used to regulate the pressure or flow rate of the treated additive particles (or fluids containing the treated additive particles, and any sensors (i.e., pressure and temperature), gauges, and/or combinations thereof, and the like. The disclosed treated additive particles may also directly or indirectly affect the various downhole equipment and tools that may come into contact with the treated additive particles such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present invention, the following examples of some of the preferred embodiments are given. In no way should such examples be read to limit, or to define, the scope of the invention.

To determine the effect of a polyaminated fatty acid-based oil composition for dust control of additive particles, the following example was performed. Sand having particles size distributions of 20/40 mesh and 30/50 mesh with some dust was treated with a polyaminated fatty acid-based oil composition. First, the polyaminated fatty acid-based oil composition was prepared by mixing 25% v/v of polyaminated fatty acid with 75% v/v of vegetable oil, wherein "% v/v" refers to volume of the component by total volume of the polyaminated fatty acid-based oil composition. To treat the sand, about 100 grams of sand were added to a 500 mL glass bottle. Using a spray air gun, about 0.25 mL of the polyaminated fatty acid-based oil composition was sprayed onto the sand in the glass bottle at 20 pounds per square inch of pressure while rolling the glass bottle.

For qualitative determination of dust control effectiveness, the treated sand was then transferred to a beaker and blown with air through a tube at a pressure of about 15 pounds per square inch. No visible dust was produced when the treated sand was contacted with air. In contrast, visible dust was produced when untreated sand with dust was contacted with air in the same manner. The same results were found for both the 20/40 mesh and 30/50 mesh sand.

For quantitative determination of dust control effectiveness of polyaminated fatty acid-based oil composition, a sand blaster was used to generate dust and a dust monitor was used to measure the suspended particles. In the sand blaster, an air-powered pressure gun blows out sand at a high velocity to impact with the intended surface. For dust generation and measurement, sand was blown out with a fixed pressure and impacted on a metallic plate at a certain distance between the air gun and metallic plate for a fixed time. The dust concentration ($\mu g/m^3$) was measured by dust monitor. The dust monitor measures the dust concentration of mass range PM1 (Particle size less than 1 micron), PM2.5 (particle size less than 2.5 micron), PM4 (particle size less than 4 micron), PM7 (Particle size less than 7 micron), PM10 (particle size less than 10 micron) and total suspended solid (TSP). In this example, 20/40 mesh sand that was untreated sand and 20/40 mesh sand treated with 0.25% v/w of 25% polyaminated fatty acid+75% vegetable oil was used for dust generation at a pressure 20 pounds per square inch with a 3.5 inch distance between the air gun and the metallic plate. The impact time was 30 seconds. The total suspended particles generated by untreated sand were 38000 $\mu g/m^3$ while sand treated with polyaminated fatty acid-based oil composition generated only 700 $\mu g/m^3$ TSP. This indicates that polyaminated fatty acid-based oil composition reduces dust generation by almost 98% and effective for dust control.

In addition to the above results for control of dust generation, the treated sand showed comparable flowability to the untreated sand without an increase in the angle of repose of the treated sand. The same results were found for both the 20/40 mesh and 30/50 mesh sand.

Accordingly, this Example may indicate that the amount of dust may be controlled and possibly eliminated by treating additive particles with polyaminated fatty acid-based oil compositions while maintaining flowability of the additive particles.

The preceding description provides various embodiments of the additive particles that have been treated with a polyaminated fatty acid-based oil composition, as well as methods of using the treated additive particles. It should be understood that, although individual embodiments may be discussed herein, the present disclosure covers all combinations of the disclosed embodiments, including, without limitation, the different additive combinations, additive concentrations, and fluid properties.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A composition comprising:
   additive particles for a well treatment fluid; and
   a polyaminated fatty acid-based oil composition disposed on a surface of at least a portion of the additive particles, wherein the polyaminated fatty acid-based oil composition comprises a polyaminated fatty acid and an organic solvent, and wherein the polyaminated fatty acid-based oil composition is present on the additive particles in a concentration of about 0.01% v/w to about 5% v/w.

2. The composition of claim 1, wherein the additive particles comprise proppant.

3. The composition of claim 1, wherein the additive particles comprise at least one material selected from the group consisting of sand; bauxite; ceramic material; glass material; resin precoated sands; resin precoated proppants; polymer material; polytetrafluoroethylene material;

nut shell pieces; seed shell pieces; cured resinous particulate comprising nut shell pieces; cured resinous particulate comprising seed shell pieces; fruit pit pieces; cured resinous particulate comprising fruit pit pieces; wood; composite particulates and combinations thereof.

4. The composition of claim 1, wherein the polyaminated fatty acid is a saturated fatty acid that comprises two or more reactive amine groups.

5. The composition of claim 1, wherein the polyaminated fatty acid-based oil is disposed on at least 80% of the additive particles.

6. A composition comprising:

sand particles; and a polyaminated fatty acid-based oil composition disposed on a surface of at least a portion of the sand particles, wherein the polyaminated fatty acid-based oil composition comprises a polyaminated fatty acid and an organic solvent, wherein the polyaminated fatty acid is a saturated fatty acid that comprises two or more reactive amine groups;

wherein the polyaminated fatty acid-based oil composition is disposed on at least 80% of the sand particles, and wherein the polyaminated fatty acid-based oil composition is present on the sand particles in a concentration of about 0.01% v/w to about 5% v/w.

7. A method of reducing dusting, comprising:

treating additive particles with a polyaminated fatty acid-based oil composition to form a composition comprising the additive particles having the polyaminated fatty acid-based oil composition disposed on the additive particles in a concentration of about 0.01% v/w to about 5% v/w, wherein the polyaminated fatty acid-based oil composition comprises a polyaminated fatty acid and an organic solvent.

8. The method of claim 7, wherein the treating comprise spray coating at least a portion of the additive particles with the polyaminated fatty acid-based oil composition.

9. The method of claim 7, wherein the treating comprise mixing the additive particles with the polyaminated fatty acid-based oil composition.

10. The method of claim 7, wherein the additive particles comprise at least one material selected from the group consisting of sand; bauxite; ceramic material; glass material; resin precoated sands; resin precoated proppants; polymer material; polytetrafluoroethylene material;

nut shell pieces; seed shell pieces; cured resinous particulate comprising nut shell pieces; cured resinous particulate comprising seed shell pieces; fruit pit pieces; cured resinous particulate comprising fruit pit pieces; wood; composite particulates and combinations thereof.

11. The method of claim 7, wherein the polyaminated fatty acid is a saturated fatty acid that comprises two or more reactive amine groups.

12. The method of claim 7, wherein the polyaminated fatty acid-based oil is disposed on at least 80% of the additive particles.

13. The method of claim 7, wherein the polyaminated fatty acid-based oil is disposed on at least 99% of the additive particles.

* * * * *